(12) United States Patent
Wang

(10) Patent No.: US 7,297,065 B2
(45) Date of Patent: Nov. 20, 2007

(54) AUTOMOTIVE DRIVELINE COMPONENTS MANUFACTURED OF SILICONE MATERIALS

(75) Inventor: Shen-Ling Allen Wang, Northville, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 82 days.

(21) Appl. No.: 11/007,611

(22) Filed: Dec. 8, 2004

(65) Prior Publication Data

US 2006/0119048 A1    Jun. 8, 2006

(51) Int. Cl.
*F16D 3/84* (2006.01)

(52) U.S. Cl. ...................................... 464/173; 464/903

(58) Field of Classification Search ........ 464/173–175, 464/903–906; 277/634–636; 403/50, 51; 428/36.9, 36.91
See application file for complete search history.

(56) References Cited

U.S. PATENT DOCUMENTS

| | | | |
|---|---|---|---|
| 3,650,102 A * | 3/1972 | Economy et al. ........... 442/302 |
| 3,919,161 A * | 11/1975 | Glaister et al. ............... 524/14 |
| 4,330,442 A * | 5/1982 | Lindeman et al. ............ 524/16 |
| 4,813,913 A * | 3/1989 | Belter ......................... 464/175 |
| 4,927,678 A | 5/1990 | Lallement |
| 5,122,562 A * | 6/1992 | Jeram et al. ................. 524/403 |
| 5,145,191 A * | 9/1992 | Stewart et al. .......... 464/175 X |
| 5,179,148 A * | 1/1993 | Inoue et al. ................. 524/265 |
| 5,228,876 A * | 7/1993 | Woods .................... 277/636 X |
| 5,240,766 A | 8/1993 | Foster |
| 5,286,574 A | 2/1994 | Foster |
| 5,399,602 A * | 3/1995 | Matsushita et al. ......... 524/267 |
| 5,707,066 A | 1/1998 | Sugiura et al. |
| 5,976,997 A * | 11/1999 | Meaney et al. ............. 442/232 |
| 6,232,379 B1 * | 5/2001 | Takita ......................... 524/266 |
| 6,361,444 B1 * | 3/2002 | Cheney et al. .............. 464/175 |
| 6,376,432 B1 * | 4/2002 | Leslie et al. ................ 508/137 |
| 6,479,580 B1 * | 11/2002 | Chorvath et al. ........... 524/588 |
| 2002/0034983 A1 * | 3/2002 | Saito et al. ................. 464/175 |
| 2003/0207714 A1 | 11/2003 | Ramey et al. |
| 2004/0017046 A1 | 1/2004 | Frazer et al. |

FOREIGN PATENT DOCUMENTS

| | | | |
|---|---|---|---|
| EP | 1 048 864 A2 | 11/2000 |
| FR | 2 777 336 A1 | 10/1999 |
| JP | 05-148422 | * | 6/1993 |
| JP | 08-210515 | * | 8/1996 |

OTHER PUBLICATIONS

Universal Joint and Driveshaft Design Manual, AE-7, Society of Automotive Engineers, Inc., Warrendale, PA, p. 21, TJ1079.S62 1979.*

* cited by examiner

*Primary Examiner*—Greg Binda
(74) *Attorney, Agent, or Firm*—Jennifer M Brumbaugh; Mick A Nylander

(57) ABSTRACT

A sealing component constructed of silicone compound for use in high-temperature, high-speed and high-angle applications is disclosed. The disclosed silicone material may also be reinforced with fibers for added stiffness and stability.

11 Claims, 3 Drawing Sheets

AUTOMOTIVE DRIVELINE COMPONENTS MANUFACTURED OF SILICONE MATERIALS

TECHNICAL FIELD

The invention is generally directed to driveline sealing components constructed of silicone material and more particularly to a boot assembly for a constant velocity joint that is capable of withstanding high temperature, high-speed, and high-angle applications that is constructed of silicone.

BACKGROUND

Driveline sealing components are frequently used for covering the chamber of a joint that is filled with a lubricating agent. The sealing components prevent lubricating agents from leaving the joint chamber while preventing dirt and other contaminants from entering the joint chamber.

One application that utilizes sealing components is constant velocity joints. A constant velocity joint is used to transmit rotating power from one joint member to the other joint member so as to rotate at a constant velocity while allowing the above two joint members to freely deflect the axial center lines thereof from each other within a predetermined angle range.

When the constant velocity joint is used in a driveline system of a vehicle, the joint portion of the constant velocity joint is typically covered with a boot. The boot is flexible and generally has a deformable shape such as bellows. A typical boot includes a first relatively large end that is secured to an outer race of the constant velocity joint and a second relatively small end that is secured to the shaft extending from the inner race of the constant velocity joint. In other words, one open end of the boot is positioned on the outer periphery of one joint member while the other open end is positioned on the outer periphery of the other joint member.

In the boot of this type, adjacent folds locally come in contact with one another when the constant velocity joint rotates at a high velocity with a large joint angle. As a result, wear occurs in the boot, reducing the sealing effectiveness of the boot, and shortening the effective life of the boot. One known solution to overcome the wear problems is to include wax in the boot to smooth the outer surface of the boot. However, undesirable wear still occurs, especially in high temperature applications.

Another solution to undesirable wear problems for high temperature applications that is known to the present inventor is the use of hydrogenated nitrile butadiene rubber (HNBR) material, as described in co-pending U.S. patent application Ser. No. 10/912,400, incorporated herein by reference in its entirety. HNBR material is useful in applications having a peak temperature of 150° C. peak, or 130° C. continuous. Accordingly, there is a need for a boot that is capable of withstanding higher temperatures (i.e., greater than 150° C. peak temperatures), as well as high-speed, and high-angle applications.

BRIEF SUMMARY OF THE INVENTION

The present invention is directed to sealing component for an automotive driveline assembly having a unitary body for use in high-temperature, high-velocity and high-angle applications. In accordance with one aspect of the invention, the sealing assembly is a boot seal for a constant velocity joint. To address undesirable wear conditions of known boots, the boot of the present invention is preferably constructed of silicone. Boots constructed of silicone are capable of withstanding 180° C. peak temperatures and 150° C. constant operating temperatures. For those applications that require increased stiffness in the boot, optional reinforcing fibers may be added to the silicone material.

BRIEF DESCRIPTION OF THE DRAWINGS

The accompanying drawings illustrate various embodiments of the present invention and are a part of the specification. The illustrated embodiments are merely examples of the present apparatus and do not limit the scope of the disclosure.

DETAILED DESCRIPTION

Figure 1:
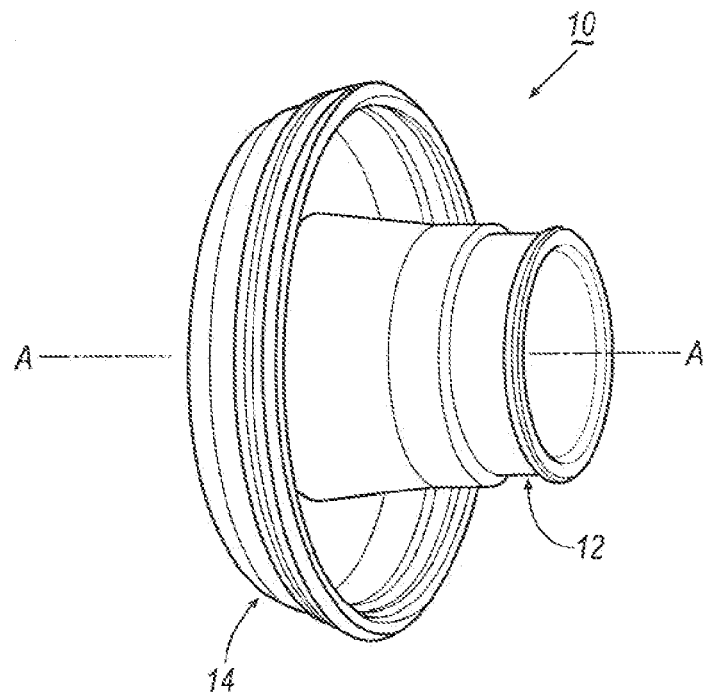
FIG. 1 is a perspective view of an embodiment of a flexible boot assembly for a constant velocity joint in accordance with the invention.
Figure 2:
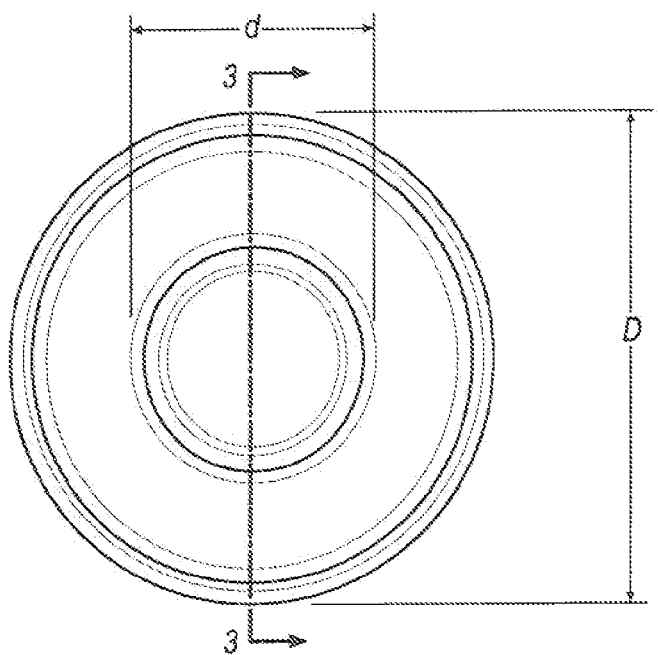
FIG. 2 is plan view of the flexible boot assembly of FIG. 1.
Figure 3:
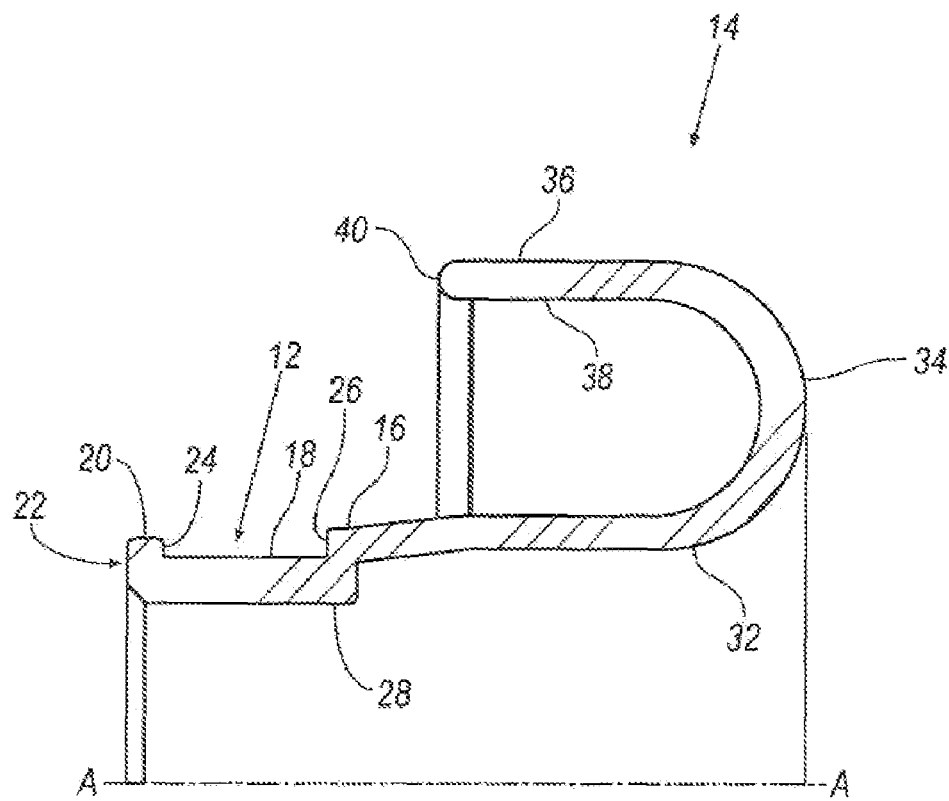
FIG. 3 is a cross-sectional view of the flexible boot assembly of FIGS. 1 and 2, taken along lines 3-3 of FIG. 2.

Referring to FIGS. 1-5, an embodiment of a flexible boot assembly, indicated generally at 10, for use with a constant velocity joint 42 (see FIG. 5) in accordance with the present invention, is shown. Boot assembly 10 includes a first sealing end portion 12, and a second sealing end portion 14. First sealing end portion 12 has a first outer diameter d that is less than the outer diameter D of second sealing end portion 14. Both first and second sealing end portions 12, 14 are positioned around a common axis A-A.

An outside surface 16 of first end portion 12 includes an annular groove 18 formed therearound. An annular ridge 20 extends around the distal end 22 of first sealing end portion 12, adjacent to annular groove 18. Annular ridge 20 defines a first flange surface 24. In one embodiment, first flange surface 24 is generally planar so as to be generally perpendicular to annular groove 18. In another embodiment, first flange surface 24 may slope inwardly so as to be angled toward annular groove 18.

A second flange 26 is positioned opposite first flange 24. In one embodiment, second flange 26 is generally planar so as to be generally perpendicular to annular groove 18. In another embodiment, second flange 26 may slope inwardly toward annular groove 18 from outside surface 16.

Figure 4:
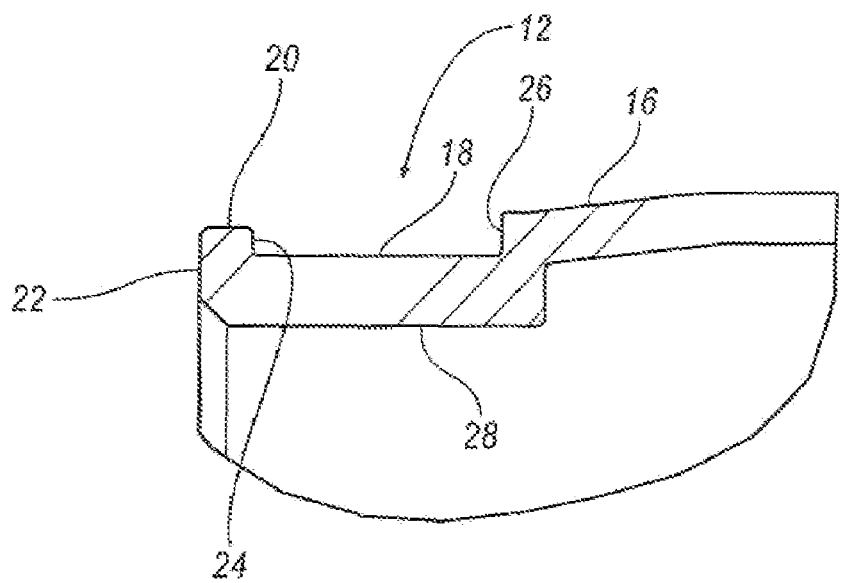
FIG. 4 is an enlarged view of one end of the flexible boot assembly taken from FIG. 3.
Figure 5:
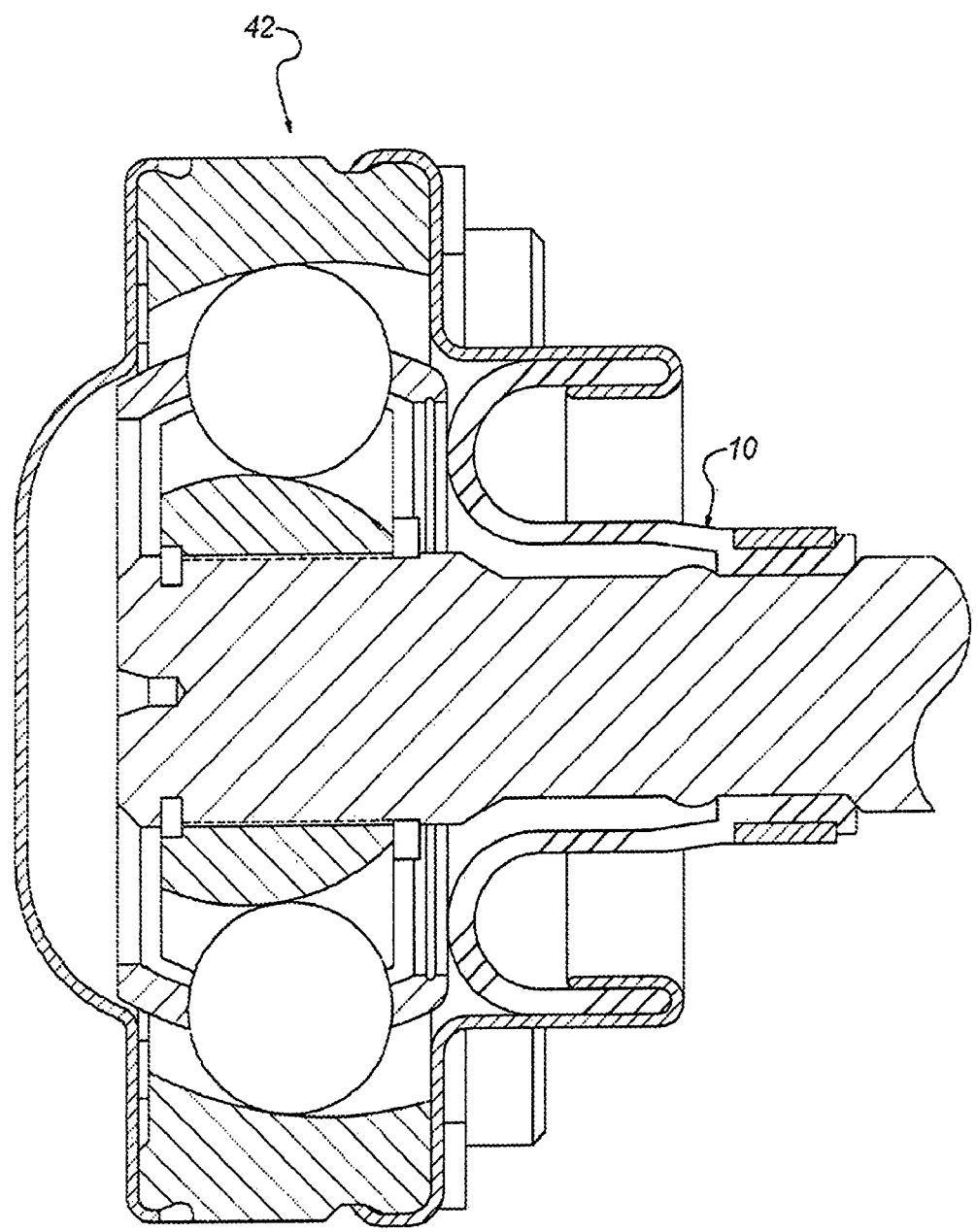
FIG. 5 is cross-sectional side view of a constant velocity joint with the flexible boot assembly of FIGS. 1 and 2 disposed thereon.

First end portion 12 also includes an inner contact surface 28. Inner contact surface 28 may be generally planar as shown in FIG. 4. Alternatively, inner contact surface 28 may include a plurality of ridges. In operation, inner contact surface 28 of first end portion 12 frictionally engages the outside surface of a shaft (See FIG. 5). A metal band clamp (not shown) or other retaining mechanism may be provided around first end portion 12 within groove 18 to secure first end portion 12 to the shaft.

Second end portion 14 has a generally uniform thickness and is connected to first end portion 12 by a main body portion 32 and a wall portion 34. In one embodiment, wall portion 34 is curved. In an alternative embodiment (not shown) wall portion 34 may be substantially planar. Second end portion 14 includes an outer surface 36 and an inner surface 38 that are connected together at a distal end 40. In one embodiment, distal end 40 is curved, although it is understood that it may be constructed so as to include a planar surface.

While in one preferred embodiment outer and inner surfaces 36 and 38 of second end portion 14 are generally planar to provide a large surface engagement area for engaging an outer race (not shown) of a joint, it is understood that outer and inner surfaces 36 may optionally include one or more annular grooves separated by lands.

In accordance with another aspect of the invention, boot 10 is preferably a unitary construction that is made of a silicone material that is particularly suited for high temperature applications, that is applications that have a 180° C. peak temperature and/or a 150° C. continuous temperature. The inventive compound includes the following components: amorphous silica such as that available from Rhodia Industrial Specialties, Ltd.; a silicone additive that reduces water absorption such as Rhodorsil distributed by Rhodia Industrial Specialties; a release agent, such as polymethylsiloxane; and a peroxide that acts as a curing agent. It is also desirable that the inventive compounds include at least one pigment.

In some applications, high stiffness and increased strength are needed. To address such needs, in accordance with another aspect of the invention, the above-described silicone material may be reinforced with fibers. More specifically, the silicone material includes a fiber content from about 3-10 pphr (parts per hundred parts of rubber) and preferably 5 pphr. A suitable fiber includes a phenolic-based fiber such as Novoloid fibers that are distributed by American Kynol, Inc. The preferred fibers are approximately 15 μm in diameter, have an average length of 0.2 mm and have approximately 30-50% elongation.

The fibers may be added to the silicone material in a number of different methods. To insure that the fibers are sufficiently dispersed in the resulting boot, one method includes injection molding a first layer of the silicone material into the shape of boot 10. The first layer is then cured. Next, the fibers are placed over the first layer. Alternatively, an adhesive is applied to the fibers before being placed over the first layer. A second, or top, layer is then compression molded to final form boot 10. The second layer is then cured.

In an alternative embodiment, the mold may be provided with locator pins for fixing the fabric in place as the material flows through the mold. The material is then injection molded into the boot shape and cured.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. An automotive driveline assembly, comprising:
a constant velocity joint;
a dust boot seal disposed about the constant velocity joint, the dust boot seal having a unitary body constructed of silicone material capable of withstanding at least 150° C. operating temperature, wherein said silicone material is comprised of amorphous silica, one or more silicone additives, polymethylsiloxane; peroxide and at least one pigment.

2. The automotive driveline assembly of claim 1, wherein said silicone material is reinforced by phenolic based fibers.

3. The automotive driveline assembly of claim 2, wherein said fibers have an average diameter of 15 μm.

4. The automotive driveline assembly of claim 3, wherein said fibers have an average length of 0.2 mm.

5. The automotive driveline assembly of claim 4, wherein said fibers have approximately 30-50 elongation.

6. The automotive driveline assembly of claim 2, wherein said silicone material has a fiber content of approximately five pphr.

7. The automotive driveline assembly of claim 2, wherein the silicone material defines first and second layers of silicone material and the fibers are disposed between the first and second layers of silicone material.

8. The automotive driveline assembly of claim 1, wherein the unitary body has a longitudinal axis and comprises a first sealing end portion and a second sealing end portion, the first sealing end portion is disposed adjacent to the second sealing end in a direction along the longitudinal axis, the first end sealing portion has a diameter, the second sealing end portion has a diameter, and the diameter of the first sealing end portion is less than the diameter of the second sealing end portion.

9. The automotive driveline assembly of claim 8, wherein the first sealing end portion and the second sealing end portion are each concentrically disposed about the longitudinal axis.

10. The automotive driveline assembly of claim 8, wherein the second sealing end portion is connected to the first sealing end portion by a main body, and the second sealing end portion and the main body define an annular space between the second sealing end portion and the main body.

11. The automotive driveline assembly of claim 10, wherein the annular space extends in a direction away from the longitudinal axis.

* * * * *

UNITED STATES PATENT AND TRADEMARK OFFICE
CERTIFICATE OF CORRECTION

PATENT NO. : 7,297,065 B2 Page 1 of 1
APPLICATION NO. : 11/007611
DATED : November 20, 2007
INVENTOR(S) : Shen-Ling Allen Wang It is certified that error appears in the above-identified patent and that said Letters Patent is hereby corrected as shown below:

In Claim 6, column 4, line 22, change "30-50" to --30-50%--

Signed and Sealed this

Fifteenth Day of July, 2008

JON W. DUDAS
*Director of the United States Patent and Trademark Office*